US012705269B1

(12) United States Patent
Sheetrit

(10) Patent No.: US 12,705,269 B1
(45) Date of Patent: Aug. 11, 2026

(54) COMPUTATIONALLY EFFICIENT LANGUAGE MODEL

(71) Applicant: Intuit Inc., Mountain View, CA (US)

(72) Inventor: Eilon Sheetrit, Tel Aviv (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/224,520

(22) Filed: May 30, 2025

(51) Int. Cl.
*G06F 16/334* (2025.01)
*G06F 16/31* (2019.01)

(52) U.S. Cl.
CPC ........ *G06F 16/3347* (2019.01); *G06F 16/319* (2019.01)

(58) Field of Classification Search
CPC ........................... G06F 16/3347; G06F 16/319
USPC .......................................................... 707/769
See application file for complete search history.

(56) References Cited

U.S. PATENT DOCUMENTS 12,353,469 B1 * 7/2025 Mahabadi ............. G06F 16/332
2020/0175046 A1 * 6/2020 Wang ....................... G06N 3/08
2024/0113930 A1 * 4/2024 Zhao ....................... G06F 40/30
2024/0193208 A1 * 6/2024 Duan .................. G06F 16/7834
2024/0340653 A1 * 10/2024 Shrivastava .......... H04W 24/02
2025/0086215 A1 * 3/2025 Kumar .................. G06F 16/345
2025/0094777 A1 * 3/2025 Yakovlev ............. G06N 3/0455
2025/0238433 A1 * 7/2025 Sussman ................ G06Q 10/10
2025/0245270 A1 * 7/2025 Yushkina .......... G06F 16/90328
2025/0384249 A1 * 12/2025 Saxena ................ G06N 3/0475

OTHER PUBLICATIONS

English translation of Cn 119783811A to Jiang et al. (Year: 2025).*

* cited by examiner

*Primary Examiner* — Kimberly L Wilson
(74) *Attorney, Agent, or Firm* — Lathrop GPM LLP

(57) ABSTRACT

A method including receiving a query to a retrieval augmented generation (RAG) language model having electronic accesses to a number of potential contexts. A desired selected context is unknown when the query is received. A number of ranking models is executed on the query. Each of the number of ranking models outputs a corresponding candidate context from among the number of potential contexts. A number of vector data structures are generated by transforming, for each output of the number of ranking models, a combination of the query and the corresponding candidate context into a corresponding vector data structure. A predictor model is executed on the number of vector data structures to generate the selected context from among the number of potential contexts. The RAG language model is enhanced by applying the selected context to the RAG language model to generate an enhanced RAG language model.

19 Claims, 7 Drawing Sheets

COMPUTATIONALLY EFFICIENT LANGUAGE MODEL

BACKGROUND

A language model is a type of machine learning model, often a neural network, used to predict the probability of a sequence of words in a language. The language model learns patterns and dependencies within a language by analyzing a large corpus of text and assigning probabilities to different word sequences. In this manner, a language model can generate new text, translate languages, answer questions, summarize selected texts, and perform other useful functions.

However, language models are subject to hallucination. In the context of language models, the term "hallucination" means that the language model sometimes generates output that is factually incorrect, nonsensical, internally inconsistent, inconsistent with the command prompt to the language model, or otherwise does not align with reality. Language model hallucination is not always easy to identify; for example, a language model may generate false, nonexistent citations to support a fact stated in the output. The false citations appear to be real citations, until the false citations are checked and the false citations are found to refer to nonexistent source documents.

One method for reducing language model hallucination is to use a retrieval augmented generation (RAG) language model framework, also referred to as a "RAG framework." A RAG framework includes a language model, a source of text (called a "context") that serves as a source of true statements, and one or more commands (called a "prompt") that instruct the language model to base the output of the language model on the information in the context.

For example, a RAG framework may be specifically designed to answer questions about U.S. presidential history. Such a RAG framework includes a language model, a context in the form of a body of text that describes a verified history of the presidents of the United States of America, and a command added to every prompt submitted to the language model to reference the context when answering a new query. When a user generates a query, such as "who was the second person to become president of the United States," the query is added to the prompt, and the prompt is submitted as input to the language model. The language model executes the prompt and thus refers to the context that describes presidential history when generating the answer to the query. In the example, the language model generates the text output, "John Adams," because the context correctly identifies John Adams as the second person to become president of the United States of America.

However, a technical difficulty arises when multiple contexts are used to support a RAG framework. For example, a language model is used to answer queries on an industrial scale regarding a wide range of different financial topics, such as tax, accounting, investing, etc. In such a RAG framework, hundreds of contexts may be available for use, including tax tables, tax instructions, accounting texts, accounting practices, client data, investing information, new fees, and many more. In such a RAG framework, no means exist for determining which context is appropriate for any given query. Thus, a command to use all information in all the available contexts is added the prompt to which all queries are added.

However, commanding a language model with hundreds of billions of parameters to analyze hundreds of contexts when generating an answer to a query is computationally inefficient. The language model experiences unacceptable latency (the time used by computing resources to execute the language model and return a result) and uses an unacceptable amount of computational resources to generate the answer (e.g., computer processor cycles). At an industrial scale where tens of thousands of queries are received a day, an average latency of half a second per output can result in many hours of wasted time, electricity, money, and equipment.

Thus, a technical problem may arise in RAG frameworks having multiple contexts. The technical problem is that a RAG framework having multiple contexts is computationally inefficient. Methods and systems are sought for increasing the computational efficiency of a language model in a multi-context RAG framework.

SUMMARY

One or more embodiments provide for a method. The method includes receiving a query to a retrieval augmented generation (RAG) language model having electronic accesses to a number of potential contexts. The number of potential contexts further include a selected context, applicable to the query, selected from among the number of potential contexts. The selected context is unknown when the query is received. The method also includes executing a number of ranking models on the query. Each of the number of ranking models outputs a corresponding candidate context from among the number of potential contexts. The method also includes generating a number of vector data structures by transforming, for each output of the number of ranking models, a combination of the query and the corresponding candidate context into a corresponding vector data structure. The method also includes executing a predictor model on the number of vector data structures to generate the selected context from among the number of potential contexts. The method also includes enhancing the RAG language model by applying the selected context to the RAG language model to generate an enhanced RAG language model.

One or more embodiments also provide for a system. The system includes a computer processor and a retrieval augmented generation (RAG) language model executable by the computer processor. The system also includes a data repository in communication with the computer processor and storing a query and a number of potential contexts. The data repository also stores a selected context applicable to the query. The data repository also stores a corresponding candidate context. The data repository also stores a number of vector data structures. The system also includes a number of ranking models which, when executed by the computer processor on the query, outputs, for each of the number of ranking models, the corresponding candidate context from among the number of potential contexts. The system also includes a vector model which, when executed by the computer processor, transforms a combination of the query and the corresponding candidate context into a corresponding vector data structure for each output of the number of ranking models. The number of vector data structures are generated by transforming. The system also includes a predictor model which, when executed by the computer processor on the number of vector data structures, generates the selected context from among the number of potential contexts. The system also includes a server controller which, when executed by the computer processor, enhances the RAG language model by applying the selected context to the RAG language model to generate an enhanced RAG language model.

One or more embodiments provide for another method. The method includes receiving a query to a retrieval augmented generation (RAG) language model having electronic accesses to a number of potential contexts. The number of potential contexts further include a selected context, applicable to the query, selected from among the number of potential contexts. The selected context is unknown when the query is received. The method also includes executing a number of ranking models on the query. Each of the number of ranking models outputs a corresponding candidate context from among the number of potential contexts. The method also includes generating a number of vector data structures by transforming, for each output of the number of ranking models, a combination of the query and the corresponding candidate context into a corresponding vector data structure. The method also includes executing a predictor model on the number of vector data structures to generate the selected context from among the number of potential contexts. The method also includes increasing a computational efficiency of the RAG language model by reducing a number of tokens applied to the RAG language model by applying only the selected context to the RAG language model to generate an enhanced RAG language model. The method also includes executing the enhanced RAG language model on a combination of the selected context, the query, and a prompt to generate a response to the query. The method also includes returning the response.

Other aspects of one or more embodiments will be apparent from the following description and the appended claims.

BRIEF DESCRIPTION OF DRAWINGS

Like elements in the various figures are denoted by like reference numerals for consistency.

DETAILED DESCRIPTION

Figure 1:
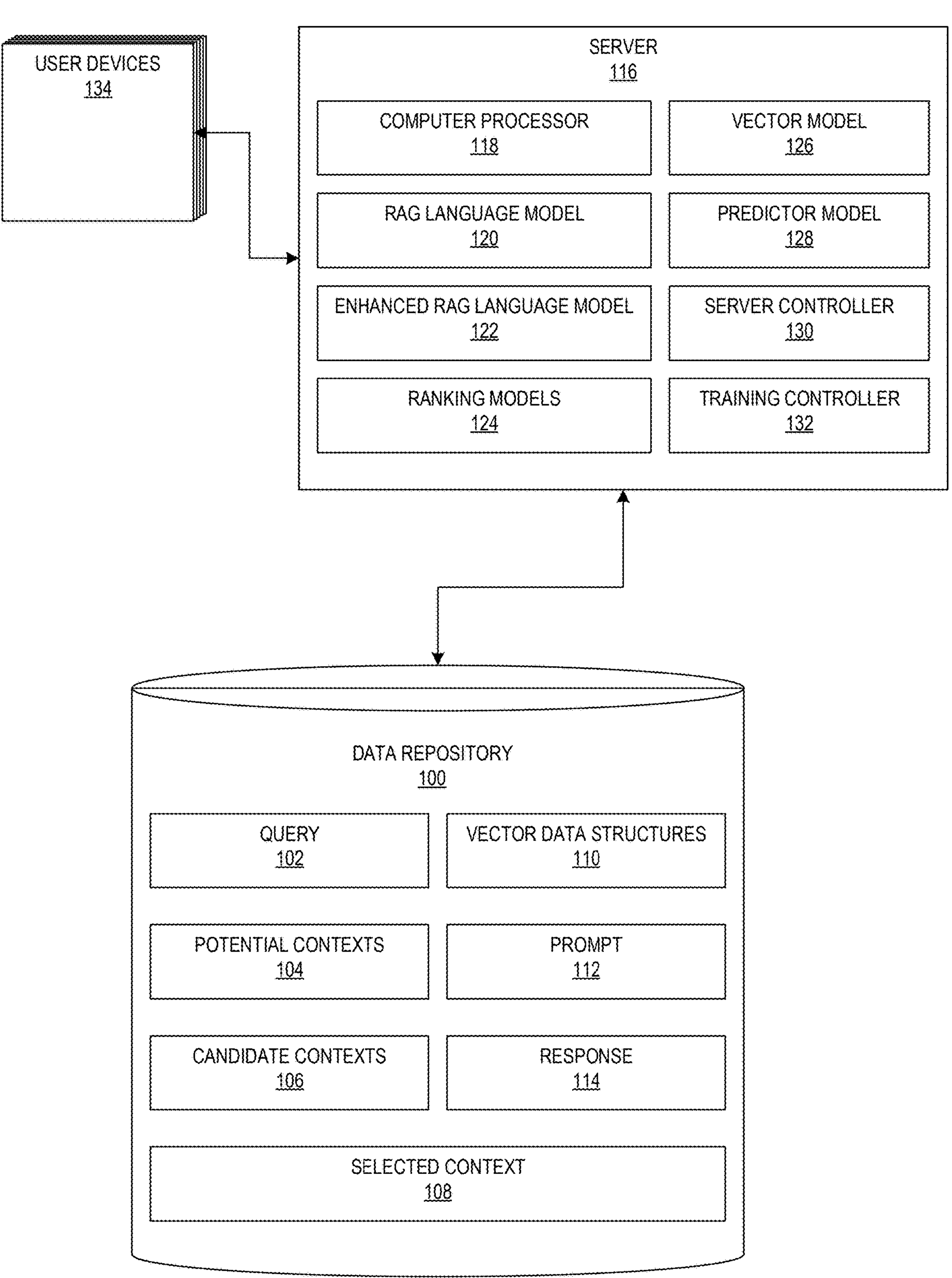
FIG. 1 shows a computing system for a computationally efficient language model, in accordance with one or more embodiments.

One or more embodiments are directed to systems and methods for computationally efficient language models in a multi-context retrieval augmented generation (RAG) system. One or more embodiments present a technical solution to the technical problem of computationally inefficient language models in multi-context RAG systems.

Briefly, the technical solution includes a machine learning model ensemble that is used to identify a selected context that is computationally determined to be most relevant to a new query. When a new query is received, the new query is submitted both to the language model and to one or more ranking models. Each ranking model is trained to select a candidate context from among the available potential contexts. Thus, a candidate context is one of the potential contexts that a given ranking model predicts is most relevant to the query.

Then, the candidate contexts are provided as input to a predictor model. The predictor model predicts one or more selected context from among the candidate contexts. The selected context is a prediction as to which of the candidate contexts is most relevant to the query.

The selected context and the query are encoded or combined into a prompt used as input to the language model. The language model therefore refers to one context, or a few contexts, as opposed to many contexts. Thus, one or more embodiments save computational resources and establish a computationally more efficient RAG framework.

In more detail, one or more embodiments may include a preparation phase and a prediction phase. During the preparation phase, the available contexts are parsed and encoded into vector data structures known as context vectors. A vector data structure is a computer readable data structure that stores information in the form of features and values. A feature is a type of information and a value is a number assigned to indicate the value of the feature. Each context vector includes many features, each having a separate value. The context vectors thereby summarize or encode the information in the contexts for consumption as input to a machine learning model. The context vectors are used to train a classification machine learning model, referred to as a ranking model, that is trained to classify a selected vector from among the context vectors as being most relevant to a query.

During the prediction phase, a new query is received. The query is provided as input to one or more ranking models, along with the context vectors generated during the preparation phase. The ranking models output one or more candidate contexts.

The candidate contexts and the query may be provided as input to a predictor model. The predictor model outputs a selected context, or multiple selected contexts, from among the candidate contexts.

Then, a query encoder combines or encodes the query and the selected context into a prompt. The prompt is submitted to the language model, which then refers to the selected context during execution of the prompt, rather than to multiple available contexts. As a result, computational resources are saved and a computationally more efficient RAG framework is created. Yet further, the language model output of one or more embodiments is more accurate, compared to a multi-context RAG framework, because the language model refers to the most context that is most relevant to the query.

Attention is now turned to the figures. FIG. 1 shows a computing system, in accordance with one or more embodiments. The system shown in FIG. 1 includes a data repository (100). The data repository (100) is a type of storage unit or device (e.g., a file system, database, data structure, or any other storage mechanism) for storing data. The data repository (100) may include multiple different, potentially heterogeneous, storage units and/or devices.

The data repository (100) stores a query (102). The query (102) is alphanumeric text that commands a language model (e.g., the RAG language model (120) defined below) to perform a computing function. For example, the query (102) may be a request for the RAG language model (120) to answer a question. The query (102) may be a request for the RAG language model (120) to summarize text in one or more of the potential contexts (104) (defined below). The query (102) may be, generally, any command suitable for execution by the RAG language model (120).

The data repository (100) also stores multiple potential contexts (104). The potential contexts (104) are sources of alphanumeric text data stored as discrete logical units. A logical unit is a group of alphanumeric text data associated according to a type or category of information. Thus, while each of the potential contexts (104) may be stored in separate data structure files, it is possible that some of the potential contexts (104) are stored in a same data structure file and separated logically. In any case, the potential contexts (104) are stored in the data repository (100) in a computer readable format.

The data repository (100) stores one or more candidate contexts (106). The candidate contexts (106) are selected from the potential contexts (104). The candidate contexts (106) are output by one or more ranking models (124), defined below.

The data repository (100) also stores a selected context (108). The selected context (108) is one of the potential contexts (104), and may be one of the candidate contexts (106). In an embodiment, as described below, determination of the candidate contexts (106) from the potential contexts (104) may be avoided. In such a case, the candidate contexts (106) is selected directly from the potential contexts (104). However, such as in the example of FIG. 3, the selected context (108) is selected from among the candidate contexts (106), which are winnowed from the potential contexts (104). The candidate contexts (106) is an output of the predictor model (128), defined below.

The data repository (100) also stores one or more vector data structures (110). A vector data structure is a computer readable data structure that stores information in the form of features and values. A feature is a type of information and a value is a number assigned to indicate the value of the feature. A vector may take the form of a one dimensional matrix composed of values, where each value represents a corresponding feature.

The vector data structures (110) may be context vectors. A context vector contains, in an embedded form, the data in one of the potential contexts (104). An embedded form means that the data is stored in the form of features and values, as defined above for the vector data structures (110). Each context vector therefore includes many features, each having a separate value. The context vectors thereby summarize or encode the information in the contexts for consumption as input to a machine learning model. The context vectors are used to train one or more classification machine learning models (i.e., the ranking models (124) and the predictor model (128)) that are trained to classify the selected context (108) from among the context vectors.

The data repository (100) also stores a prompt (112). The prompt (112) is a string of alphanumeric characters and spaces, typically in the form of human-readable text. The prompt (112) expresses a command to a language model (i.e., the RAG language model (120) or the enhanced RAG language model (122)). The prompt (112) includes at least the query (102) and a command to reference the selected context (108) when answering the query. The prompt (112) may include other commands to the RAG language model (120) or the enhanced RAG language model (122), such as system messages that constrain how the language model should approach answering the query (102).

The data repository (100) also stores a response (114). The response (114) is an output of the RAG language model (120) or the enhanced RAG language model (122). The response (114) takes the form of alphanumeric text, typically in a human-readable format.

The system shown in FIG. 1 may include other components. For example, the system shown in FIG. 1 also may include a server (116). The server (116) is one or more computer processors, data repositories, communication devices, and supporting hardware and software. The server (116) may be in a distributed computing environment. The server (116) is configured to execute one or more applications, such as the RAG language model (120), the enhanced RAG language model (122), the ranking models (124), the vector model (126), the predictor model (128), the server controller (130), and the training controller (132). An example of a computer system and network that may form the server (116) is described with respect to FIG. 7A and FIG. 7B.

The server (116) includes a computer processor (118). The computer processor (118) is one or more hardware or virtual processors which may execute computer readable program code that defines one or more applications, such as the RAG language model (120), the enhanced RAG language model (122), the ranking models (124), the vector model (126), the predictor model (128), the server controller (130), and the training controller (132). An example of the computer processor (118) is described with respect to the computer processor(s) (702) of FIG. 7A.

The server (116) also includes a RAG language model (120), also termed a "retrieval augmented generation" language model framework. The RAG language model (120) includes a prompt (i.e., the prompt (112)), one or more contexts (e.g., the potential contexts (104), the candidate contexts (106), the selected context (108)), and a natural language processing machine learning model. An example of the language model may be a large language model, such as CHATGPT® by OpenAI. However, different language models may be used. However, the RAG language model (120) is more than just the language model itself. The RAG language model (120) is the RAG framework that includes the contexts and the prompt (112). Use of the RAG language model (120) is described with respect to FIG. 2 and exemplified by FIG. 3.

The server (116) also includes an enhanced RAG language model (122). The enhanced RAG language model (122) is the RAG language model (120) when executed using the selected context (108), rather than when executed using the set of potential contexts (104) or the set of candidate contexts (106). The neural network structure of the language model itself remains unchanged. However, the enhanced prompt and identified context permit the RAG framework (i.e., the language model itself, the selected context (108), and the prompt (112)) to execute in a much more efficient manner than the RAG language model (120) could execute. The efficiency gain, combined with the flexibility of receiving many queries applicable to many contexts, is achieved by narrowing the contexts to the selected context (108) based on the contents of the query (102). The method of achieving the solution is described in FIG. 2 and exemplified in FIG. 3.

The RAG language models used by the system of FIG. 1 may include neural networks and may operate using one or more layers of weights that may be sequentially applied to sets of input data, which may be referred to as input vectors. For each layer of a machine learning model, the weights of the layer may be multiplied by the input vector to generate a collection of products, which may then be summed to generate an output for the layer that may be fed, as input data, to a next layer within the machine learning model. The output of the machine learning model may be the output generated from the last layer within the machine learning model. Multiple machine learning models may operate sequentially or in parallel. The output may be a vector or scalar value. The layers within the machine learning model may be different and correspond to different types of models. As an example, the layers may include layers for recurrent neural networks, convolutional neural networks, transformer models, attention layers, perceptron models, etc. Perceptron models may include one or more fully connected (also referred to as linear) layers that may convert between the different dimensions used by the inputs and the outputs of a model. Different types of machine learning algorithms may be used, including regression, decision trees, random forests, support vector machines, clustering, classifiers, principal component analysis, gradient boosting, etc.

The server (116) also includes a number of ranking models (124). The ranking models (124) are different prediction machine learning models that predict which of the potential contexts (104) are contextually related to the query (102). Examples of the ranking models (124) include sparse retrievers, such as BM25 and QL; dense retrievers, such as DPR, language models, or SPLADE; and other prediction models. The ranking models (124) are trained to take, as input, the vector data structures (110). The vector data structures (110) include a vector form of the query (102) combined with vector forms of the potential contexts (104).

In an embodiment, multiple, possibly many ranking models (124) are present. However, in an embodiment, one ranking model is used. In still another embodiment, no ranking models are used, in which case the predictor model (128) selects the selected context (108) directly. In an embodiment, each of the ranking models (124) outputs one candidate contexts (106). Thus, if multiple ranking models (124) are present, then multiple candidate contexts (106) are generated.

The server (116) also includes a vector model (126). The vector model (126) may be an embedding machine learning model that is trained to convert data (e.g., natural language text, image files, etc., such as the query (102), the potential contexts (104), the candidate contexts (106), and the selected context (108)) into a vector data structure composed of features and values (e.g., the vector data structures (110)). An example of the vector model (126) for natural language text may be an ADA-002 machine learning model. However, different embedding models may be used. Use of the vector model (126) is described with respect to FIG. 2.

The server (116) also may include a predictor model (128). The predictor model (128) is a classification machine learning model or a predictor machine learning model that is trained to select the selected context (108) from among the candidate contexts (106). In an embodiment, the predictor model (128) may directly select the selected context (108) from among the potential contexts (104). The predictor model (128) may be a linear regression model, a support vector machine model, or similar models. Use of the predictor model (128) is described with respect to FIG. 2 and exemplified by FIG. 3.

The server (116) also may include a server controller (130). The server controller (130) is software or application specific hardware which, when executed by the computer processor (118), controls and coordinates operation of the software or application specific hardware described herein. The server (116) may execute the method of FIG. 2. The server controller (130) also may control and coordinate execution of the RAG language model (120), the enhanced RAG language model (122), the ranking models (124), the vector model (126), and the predictor model (128).

The server (116) also may include a training controller (132). The training controller (132) is software or application specific hardware which, when executed by the computer processor (118), trains one or more machine learning models (e.g., the RAG language model (120), the enhanced RAG language model (122), the ranking models (124), the vector model (126), and the predictor model (128)).

The machine learning models of one or more embodiments may be trained by inputting training data to a machine learning model to generate training outputs that are compared to expected outputs. For supervised training, the expected outputs may be labels associated with a given input. For unsupervised learning, the expected outputs may be previous outputs from the machine learning model. The difference between the training output and the expected output may be processed with a loss function to identify updates to the weights of the layers of the model. After training on a batch of inputs, the updates identified by the loss function may be applied to the machine learning model to generate a trained machine learning model. Different algorithms may be used to calculate and apply the updates to the machine learning model, including back propagation, gradient descent, etc.

The system shown in FIG. 1 also may include one or more user devices (134). The user devices (134) are computing systems (e.g., the computing system (700) shown in FIG. 7A) that communicate with the server (116). The query (102) may be received from one or more of the user devices (134).

The user devices (134) may be considered remote or local. A remote user device is a device operated by a third-party (e.g., an end user of a chatbot) that does not control or operate the system of FIG. 1. Similarly, the organization that controls the other elements of the system of FIG. 1 may not control or operate the remote user device. Thus, a remote user device may not be considered part of the system of FIG. 1.

In contrast, a local user device is a device operated under the control of the organization that controls the other components of the system of FIG. 1. Thus, a local user device may be considered part of the system of FIG. 1.

While FIG. 1 shows a configuration of components, other configurations may be used without departing from the scope of one or more embodiments. For example, various components may be combined to create a single component. As another example, the functionality performed by a single component may be performed by two or more components.

Figure 2:
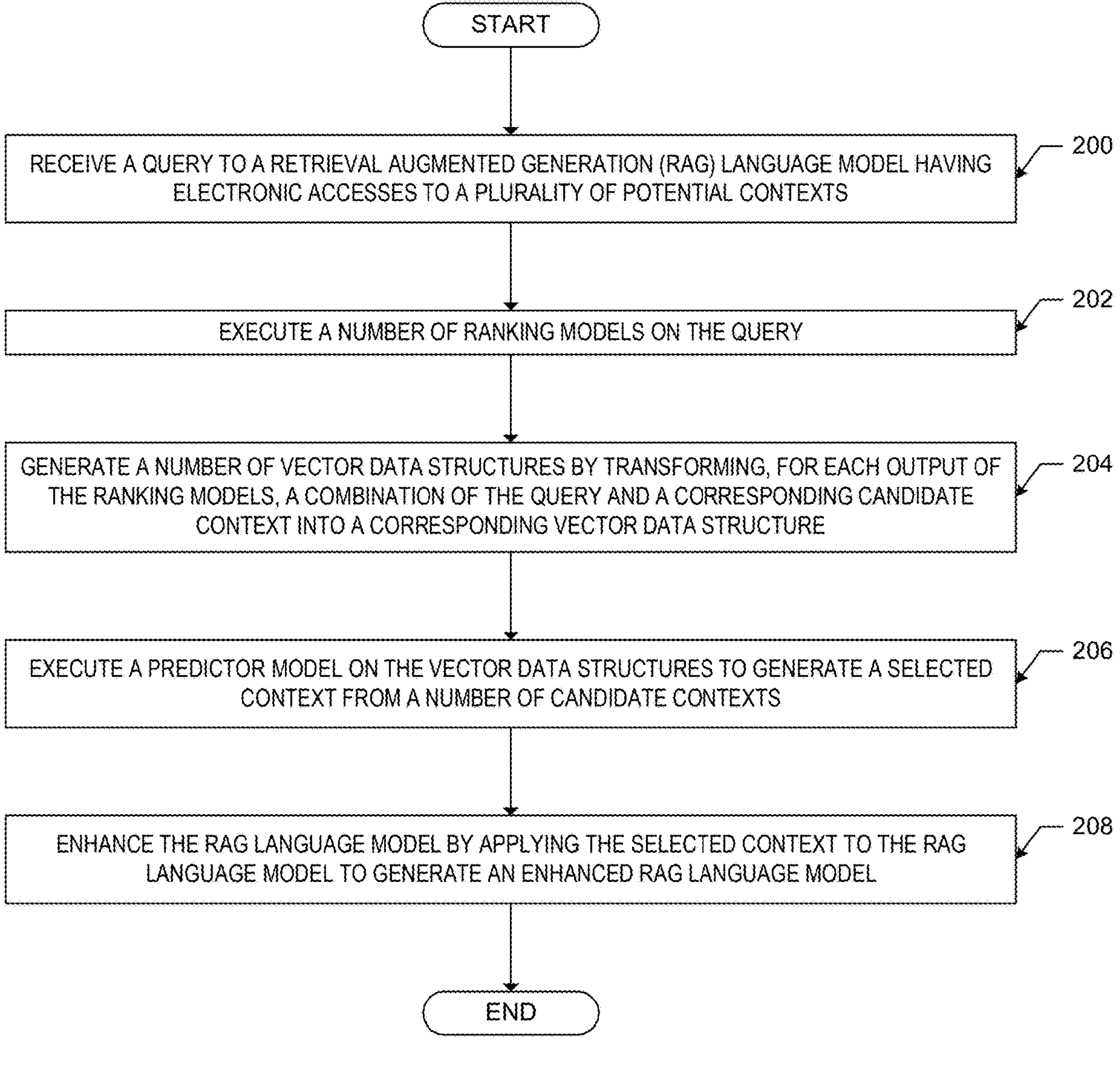
FIG. 2 shows a flowchart of a method for a computationally efficient language model, in accordance with one or more embodiments.

FIG. 2 shows a flowchart of a method for an improved, computationally efficient language model, in accordance with one or more embodiments. The method of FIG. 2 may be implemented using the system of FIG. 1 and one or more of the steps may be performed on or received at one or more computer processors.

Step 200 includes receiving a query to a retrieval augmented generation (RAG) language model having electronic accesses to a number of potential contexts. The number of potential contexts further include a selected context, applicable to the query, selected from among the number of potential contexts. The selected context is unknown when the query is received.

The query may be received from a user device. For example, a user may command the language model to answer a question, summarize a rule, perform a keyword search, etc. In any case, the RAG model framework is programmed to augment multiple potential contexts, not all of which may be relevant (as determinable by an ontology machine learning model) to the query.

Step 202 includes executing a number of ranking models on the query. Each of the ranking models outputs a corresponding candidate context from among the number of potential contexts. Executing the ranking models may include generating a vector data structure. For example, the query may be converted by a vector model into a vector. Each of the contexts may be converted by the vector model into vectors (or may have been previously converted into vectors). The query vector and the context vectors are combined into an input vector. The input vector is input to each of the ranking models and then executed. Each ranking model outputs one or more candidate contexts predicted to be contextually relevant to the query. Because multiple ranking models exist, in an embodiment, multiple candidate contexts are generated.

The step of executing the ranking models to generate the candidate contexts (106) may be modified to enhance the computational efficiency of the method of FIG. 2.

For example, within step 202, the method also may include excluding, while executing the number of ranking models on the query, an output of a rejected ranking model in the number of ranking models. The rejected ranking model may be rejected in response to the rejected ranking model exceeding a threshold latency time to return a rejected candidate context. Then, the method includes selecting, prior to executing the number of ranking models on the query, the number of ranking models from a superset of ranking models.

For example, assume ten ranking models are used. Each ranking model receives the input vector (including a combination of the query and the candidate contexts). Three of the models take more than a tenth of a second to output a result, due to lack of computational resources. The outputs of the three models are automatically excluded. Instead, the outputs of the remaining seven models become the seven candidate contexts.

In an embodiment, step 202 also may include determining, prior to executing the predictor model, a type of the query. In this case, the number of ranking models is selected based on the type of the query. For example, assume the type of query is determined, by a classification model, to be a tax question. In this case, the contexts that are unrelated to tax issues are excluded from the list of candidate contexts prior to executing step 202, thereby saving computational resources. In an embodiment, if one such context remains, then step 202 could be skipped in favor of using the one remaining context after determining the type of the query and using that type to narrow the list of candidate contexts.

In still another embodiment, step 202 may include determining, prior to executing the predictor model, a source of the query. In this case, the number of ranking models may selected based on the source of the query. For example, if the source of the query is a financial management application, then contexts not related to the financial management application may be excluded from the list of candidate contexts. Thus, as explained above, further computational efficiency may be achieved.

Step 204 includes generating a number of vector data structures by transforming, for each output of the number of ranking models, a combination of the query and the corresponding potential context or candidate context into a corresponding vector data structure. In an embodiment, each of the potential contexts or candidate contexts may already have been generated (see, for example, FIG. 3). In this case, generating the vector data structures may include converting the query into a query vector and then appending or otherwise combining the query vector with the existing vector data structure.

In an embodiment, multiple context vector data structures may exist. In this case, those candidate vector data structures may be appended or combined with each other, and further include the query vector. Thus, a single vector data structures may be generated at step 204. However, in another embodiment, multiple vector data structures may be generated, each one including a combination of the query and a corresponding potential context or candidate context.

Step 206 includes executing a predictor model on the number of vector data structures to generate a selected context from the number of candidate contexts. The predictor model takes, as input the single vector described above (which includes data describing the query and the candidate contexts) or the predictor model may take multiple vectors (combinations of the query and one context vector data structure). In the former case, the predictor model may output the selected context. In the latter case, the predictor model may output a series of probabilities that indicates the probability that a given context should be the selected context. Then, the context corresponding to the candidate context having the highest probability is selected as the selected context.

In still another embodiment, the selected context may include multiple candidate contexts. For example, contexts having probabilities output by the predictor model that are above a probability threshold may be selected for use as contexts by the RAG language model. Accordingly, one or more embodiments are not necessarily limited to referring a single selected context when executing the prompt on the query (102).

In yet another embodiment, the predictor model may execute directly on the set of vector data structures that represent combinations of the query and the potential contexts. In other words, use of the predictor models at step 206 could be omitted in some embodiments.

Step 206 also may include selecting the predictor model from among a number of predictor models. In other words, the predictor model may be different from query to query. In this case, the method also includes determining, prior to executing the predictor model, a type of the query. The predictor model is then selected based on the type of the query.

Alternatively, step 206 also may include determining, prior to executing the predictor model, a source of the query. In this case, the predictor model may be selected based on the source of the query.

In still another embodiment, at step 206, the predictor model may include a number of predictor models that generate a number of prediction scores corresponding to the number of potential contexts. In this case, the method further includes combining the number of prediction scores to determine a set of final prediction scores for the number of potential contexts. Then, the method includes selecting the selected context according to a highest final prediction score from among the set of final prediction scores. The number of predictor models predict at least two of: an entropy of a term distribution in a prompt for the RAG language model, a readability score of the number of potential contexts, a number of sentences in the prompt, a number of terms in the prompt, and a semantic similarity of the number of potential contexts to the query.

Step 208 includes enhancing the RAG language model by applying the selected context to the RAG language model to generate an enhanced RAG language model. The RAG language model may be enhanced by modifying the prompt supplied to the language model to command the RAG language model to respond to the query by consulting the selected context. The enhanced RAG language model, as explained above, is both more accurate and more computationally efficient than the original RAG language model.

The enhanced RAG language model is more computationally efficient because the selected context is contextually related to the specific query received, as determined on a query by query basis. Thus, the RAG model framework has the flexibility to handle a wide variety of queries addressing a wide variety of topics and contexts, but does not waste computational resources by executing the language model on contexts that are less relevant or irrelevant to the query.

The enhanced RAG language model is, additionally, more accurate than the original RAG language model. The enhanced RAG language model is more accurate because the language model consults the most relevant context in the set of contexts, and thus does not have the capability of drawing the output answer to the query from contexts that are less relevant or useful. Accordingly, model hallucination is reduced by forcing the enhanced RAG model to use a selected context that is more relevant to the query, relative to other available contexts.

The method of FIG. 2 may be varied. The method of FIG. 2 may include more or fewer steps, or may include different steps. For example, the method of FIG. 2 may include executing the enhanced RAG language model on a combination of the selected context, the query, and a prompt to generate a response to the query. In this case, the response may be returned. Returning the response may include displaying the response to a graphical user interface (GUI) of a user device, storing the response, passing the response to some other application that called the RAG model framework, or some other method for returning the response.

In another embodiment, the method of FIG. 2 may include generating, prior to transforming the combination, a list of candidate contexts from the corresponding candidate context output by the ranking models. In this case, vector data structures are arranged in the list. Then, the method includes enhancing the enhanced RAG language model by applying a second selected context in the list to the RAG language model.

Still other variations are possible. Thus, while the various steps in the flowchart of FIG. 2 are presented and described sequentially, at least some of the steps may be executed in different orders, may be combined or omitted, and at least some of the steps may be executed in parallel. Furthermore, the steps may be performed actively or passively.

Figure 3:
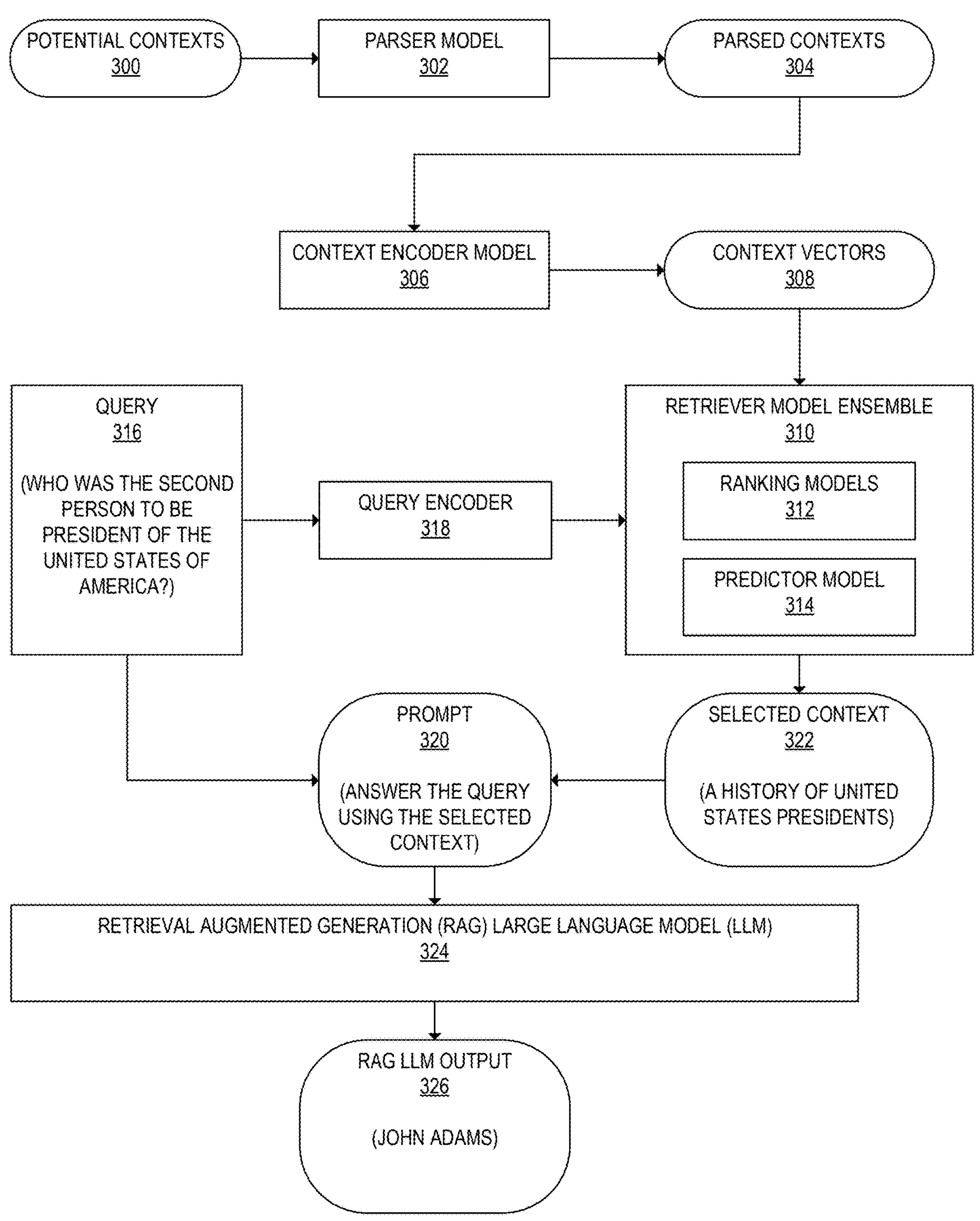
FIG. 3 shows an example of an a computationally efficient language model, in accordance with one or more embodiments.

FIG. 3 shows an example of an improved, computationally efficient language model, in accordance with one or more embodiments. The following example is for explanatory purposes only and not intended to limit the scope of one or more embodiments. The method of FIG. 3 is an example of and a variation of the method of FIG. 2. The method of FIG. 3 therefore may be implemented using the system shown in FIG. 1.

The method may begin with a preparation phase. During the preparation phase, potential contexts (300) are provided as input to a parser model (302). The parser model (302) transforms the contents of the potential contexts (300) into a format suitable for input to a context encoder model (306). For example, the parser model (302) may parse the potential contexts (300) into corresponding individual computer readable data structures broken down into tokens (i.e., letters, words, phrases, sentences, etc.) and formatted for input into the context encoder model (306).

The context encoder model (306) receives the parsed contexts (304) as input and is executed. The context encoder model (306) outputs context vectors (308). Each of the context vectors (308) corresponds to one of the potential contexts (300).

The remainder of FIG. 3 relates to an inference phase of one or more embodiments. Thus, in an embodiment, the context vectors (308) may already exist once the query (316) described below is received. Nevertheless, in an embodiment, the context vectors (308) may be generated as part of the preparation phase described above.

Once the inference phase begins, the context vectors (308) are provided as input to a retriever model ensemble (310). The retriever model ensemble (310) includes one or more ranking models (312) and a predictor model (314), which are described above with respect to FIG. 1 and FIG. 2. In addition, the query (316) is also provided as input to a query encoder (318). The query encoder (318) encodes the query encoder (318) as a vector. The query encoder (318) may append the resulting vector form of the query (316) into the context vectors (308) that are provided as input to the retriever model ensemble (310). Alternatively, the encoded vector form of the query (316) may be provided as input to the retriever model ensemble (310) in addition to the context vectors (308) input.

The retriever model ensemble (310) (i.e., the ranking models (312) and the predictor model (314)) are executed on the context vectors (308) (including the encoded vector form of the query (316) output by the query encoder (318)). As described with respect to FIG. 2, the retriever model ensemble (310) outputs a selected context (322) from among the retriever model ensemble (310).

In turn, a reference to the selected context (322) and the query (316) are combined into a prompt (320) for a RAG LLM (324) (i.e., a "retrieval augmented generation" "large language model"). The RAG LLM (324) is executed on the prompt (320). The RAG LLM output (326) is the answer to the query (316).

As a specific example, the query (316) is "who was the second person to be president of the United States of America?" The query is encoded into a vector format and appended to each of the context vectors (308). The appended context vectors (308) are provided as input to the retriever model ensemble (310). The retriever model ensemble (310) predicts that the selected context (322) (from among the potential contexts (300)) is entitled "A History of United States Presidents."

Then, the query (316) and a reference to the selected context (322) are added to a prompt (320). The prompt (320) is "answer the query using the selected context." The prompt (320) is provided to the RAG LLM (324), which then consults the selected context (322) when predicting an answer to the query (316). The output of the RAG LLM (324) is "John Adams," which is the correct answer to the question.

The procedure of FIG. 3 is flexible, in that a wide variety of queries may be answered accurately by the RAG LLM (324) because of the wide variety of potential contexts (300) that are available to the RAG model architecture. However, the procedure of FIG. 3 is also both computationally efficient and more accurate than a general RAG model framework that consults all of the potential contexts (300), because the RAG LLM (324) refers to the most relevant selected context (322) instead of all or many of the potential contexts (300) when executing on the prompt (320) to answer the query (316).

Thus, one or more embodiments provide for a RAG model framework that is computationally efficient. One or more embodiments are also flexible enough to handle multiple queries of different types for which multiple contexts are used in an industrial production enterprise environment.

At a high level, the RAG model framework includes a query prediction component (e.g., the retriever model ensemble (310)) and a generation component (e.g., the RAG LLM (324)). More specifically, the RAG model framework may incorporate the following four major parts:

The first part of the RAG model framework is a retrieval component. The retrieval component includes a set of ranking models (e.g., the ranking models (312)) that are applied concurrently for each input query (e.g., the query (316)). The ranking models (312) can include a combination of sparse and dense models. Each of the ranking models (312) may generate a list of results that may serve as candidate contexts for the selected context.

A second part of the RAG model framework may be to reduce the number of ranking models (312) used as an additional step performed as part of executing the ranking models (312), as described with respect to step 204 of FIG. 2. Ranking models that cannot produce a list of results within specified retrieval latency requirements may be filtered out of the list. The system's latency time threshold may be determined by production specifications.

A third part of the RAG model framework may be a context and prompt performance prediction using the ranking models (312). One or more embodiments may apply one or more of the ranking models (312) to a vector encoded form of the query (316) and the context vectors (308) to output a list of candidate contexts that are candidates for the selected context (322).

Each ranking model can be used alone or in combination with others using simple, lightweight models, such as linear regression models. The first group of ranking models may be termed pre-retrieval query-performance predictors. Such ranking models may be designed to predict ad hoc document retrieval effectiveness based on information induced from the query and the document corpus without using relevance judgments. The ranking models also may be used to improve retrieval effectiveness by using a maximum and average term frequency-inverse document frequency (MAX (TF*IDF)AVG(TF*IDF)) of the terms in the prompt computed with respect to a collection of documents or to a collection of prompts.

The ranking models (312) may determine an entropy of the term distribution in the prompt readability features. The ranking models (312) may determine a score, such as a Flesch score, a Gunning Fog score, or a Dale-Chall score. The ranking models (312) may determine a number of sentences in the prompt. The ranking models (312) may determine a number of terms in the prompt. The ranking models (312) may determine a similarity of the retrieved list to the query. In each case, the ranking models (312) identify one of the potential contexts (300) as being a candidate context for the selected context (322).

A fourth part of the RAG model framework is a predictor model (314) that is used to select the selected context (322). The user query, the system prompt, and the most highly ranked context on the list described above are input to the RAG LLM (324) to produce an output to the query (316).

One or more embodiments increases the probability that latency specifications are met without any compromise on prediction quality. One or more embodiments achieve the benefit by saving computational resources by decreasing the amount of calls to the language model, compared to RAG model frameworks that do not incorporate context selection logics. One or more embodiments likewise also reduce the number of instances where the user rephrases the query until a generated output satisfies the user.

One or more embodiments may include a series of pre-deployment steps. The pre-deployment steps include gathering a set of queries, context lists, and language model outputs for each input to generate labeled data for training the ranking models (312) and the predictor model (314). The ranking models (312) may be lightweight models that rank a set of context that was produced by different retrieval models. Training includes representing past queries and available contexts using feature vectors, as described above.

At inference time, given a user query, the input string of the query is fed to a set of retrieval models. Each retrieval model produces a context by inducing a list of retrieved results, e.g., passages, documents, etc. If a ranking model exceeds a retrieval latency specification, the ranking model is removed as a candidate used to determine the candidate contexts. Each input query and context is represented using a feature vector. The context is ranked using a lightweight model that was trained for the given task. The most highly ranked context, along with the query, is selected as input to the RAG LLM (324). The RAG LLM (324) then outputs the answer (i.e., the RAG LLM output (326)) in a computationally efficient manner with increased accuracy, relative to other RAG model frameworks.

Figure 4:
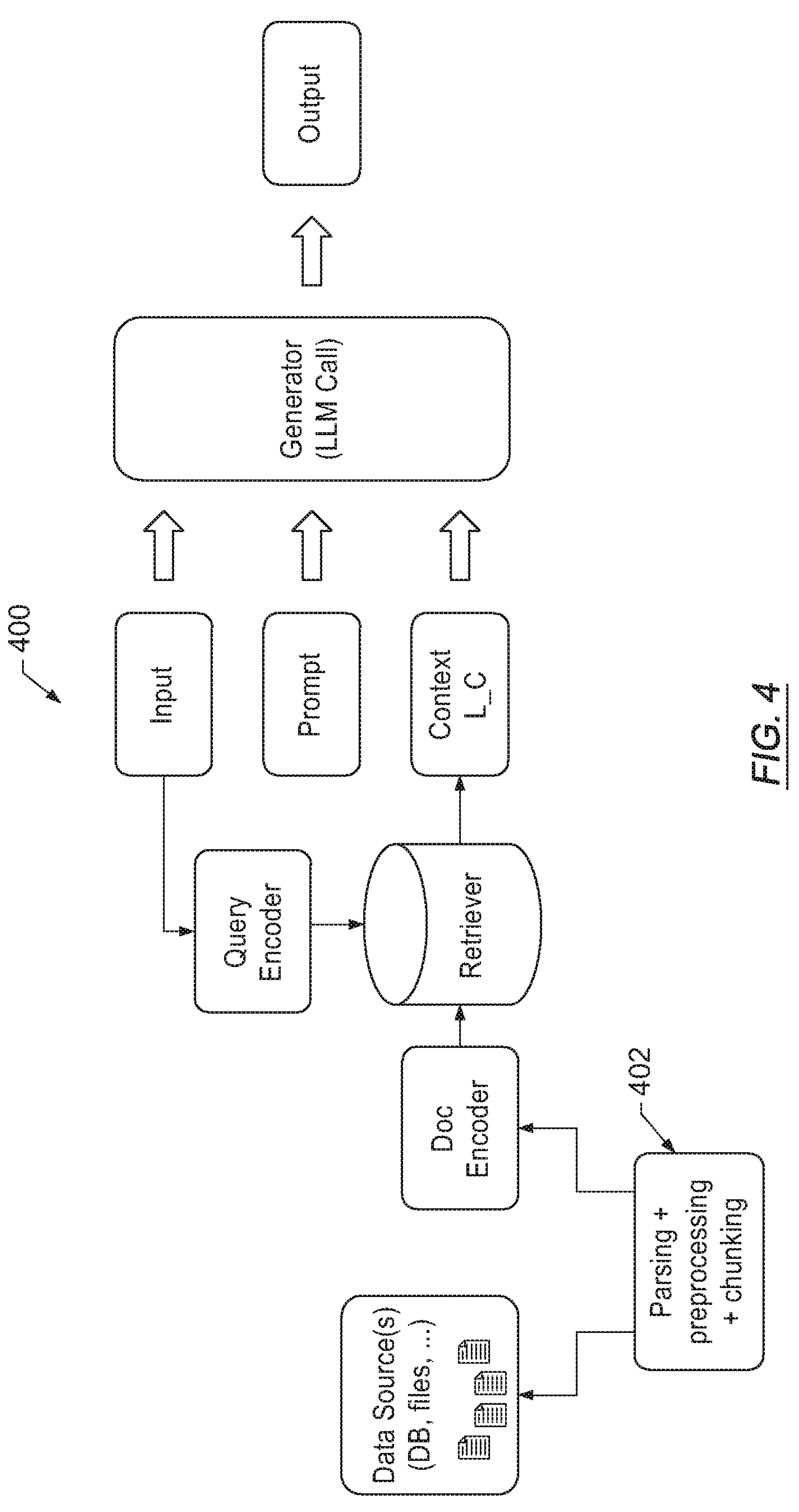
FIG. 4 shows an example of an architecture for a computationally efficient language model, in accordance with one or more embodiments.

FIG. 4 shows an example of an architecture for a computationally efficient language model, in accordance with one or more embodiments. The architecture (400) includes a data source, such as databases, files, etc., which store a large body of different contexts (e.g., 100 or more contexts). Initially, a pre-processor (402) preprocesses the contexts by parsing the contexts (e.g., parsing the contexts into tokens), chunking the contexts, and otherwise preparing the contexts for conversion into vector data structures.

Then, a document encoder (e.g. Word2Vec) encodes the pre-processed contexts into vector data structures. The vector data structures thus present the contexts in a computer readable format suitable for input to one or more machine learning models, as described further below. Thus, a retriever component now has the contexts available in a library of vector data structures.

In use, an input is received (e.g., a query from a user). The input is provided to a query encoder. The query encoder encodes the query into a data structure, or otherwise converts the query into a prompt.

Next, a retriever selects a selected context ("L_C," for the reasons given below) based on the query, as described with respect to FIG. 2 and FIG. 3. The retriever may be many classification machine learning models or language models. Thus, the retriever may be a set of ranking models that include sparse retrievers (e.g., BM25, QL, etc.), dense retrievers (e.g., a dense passage retrieval (DPR) model, a large language model, etc.), or others. Each retriever model outputs a predicted best context to use with respect to the query. The retrieved list of contexts may be referred to as "L_i," where "i" represents the "ith" instance of a context, "L."

Figure 5:
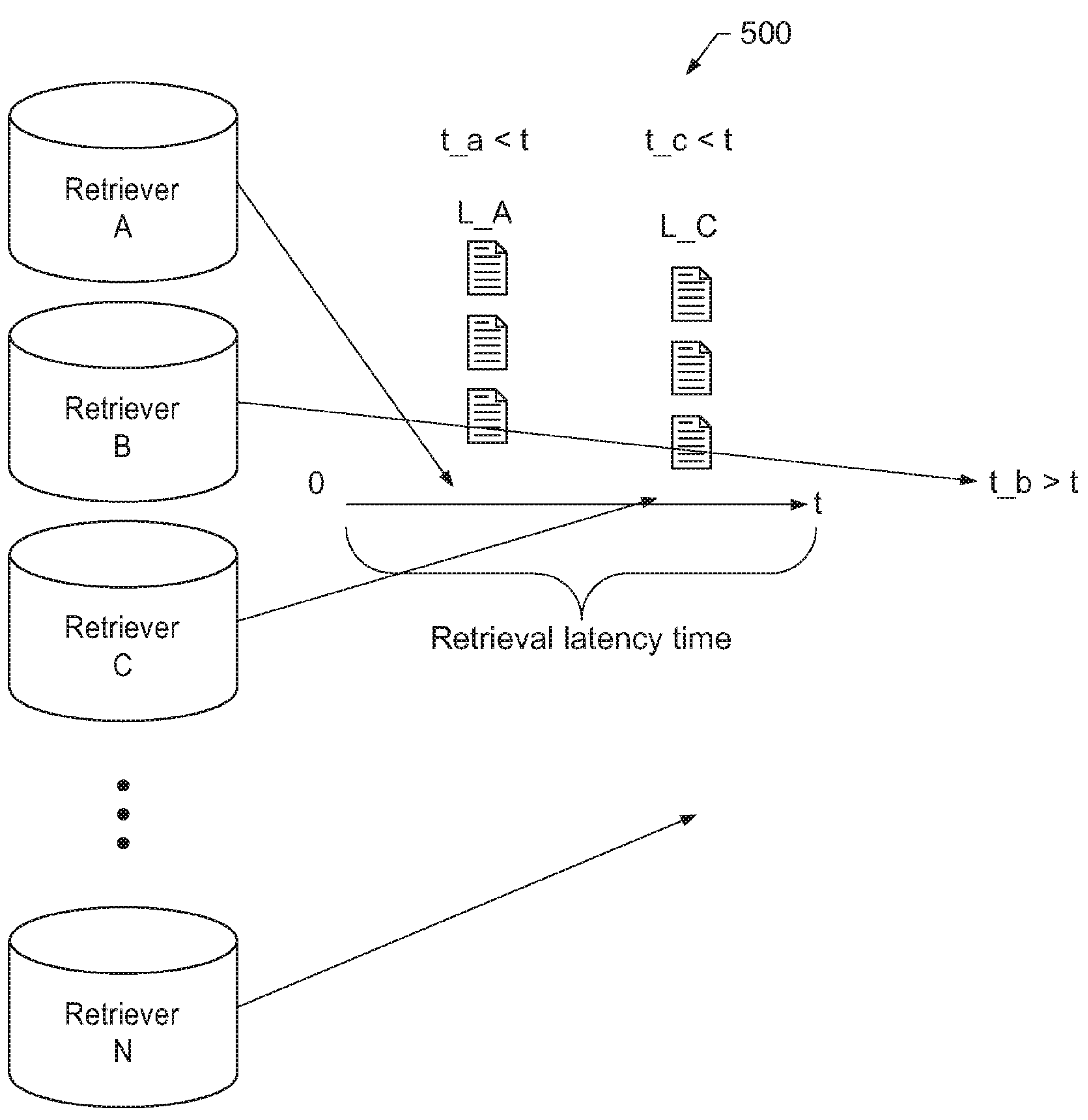
FIG. 5 shows details of the retriever in the architecture shown FIG. 4, in accordance with one or more embodiments.

FIG. 5 shows the results (500) of each of "N" retrievers present in the retriever in FIG. 4. In FIG. 5, "t" represents system latency requirements for the retrieval part. The system latency is the amount of time that any given retriever takes to generate a predicted context to use. The value of 't' is the maximum predetermined time that a retriever is permitted to generate a predicted query.

Given a query and a retrieval model, the ranking latency may exceed 't.' In this case, the output of the retriever (which has not yet been generated) may be ignored. In other words, if a retriever takes too long to generate a prediction, then that retriever's ultimate output is ignored or never recorded, and hence the context that the retriever would have generated is not added to the list of potential contexts to use to answer the query.

The latency of a model depends on the ranking model and on the input query. Thus, for some queries, the output of a retriever may be accepted (because the prediction is within the latency period 't,') but for other queries the output of the retriever may not be used (because the prediction is not within the latency period 't.')

In any case, at the end of the retriever execution step, there exists a set of contexts (a list of contexts) retrieved by different ranking models that fit the retrieval latency requirement. The list, in the example of FIG. 5, includes the list of "L_A" for retriever A and "L_C" for retriever C.

Figure 6A:
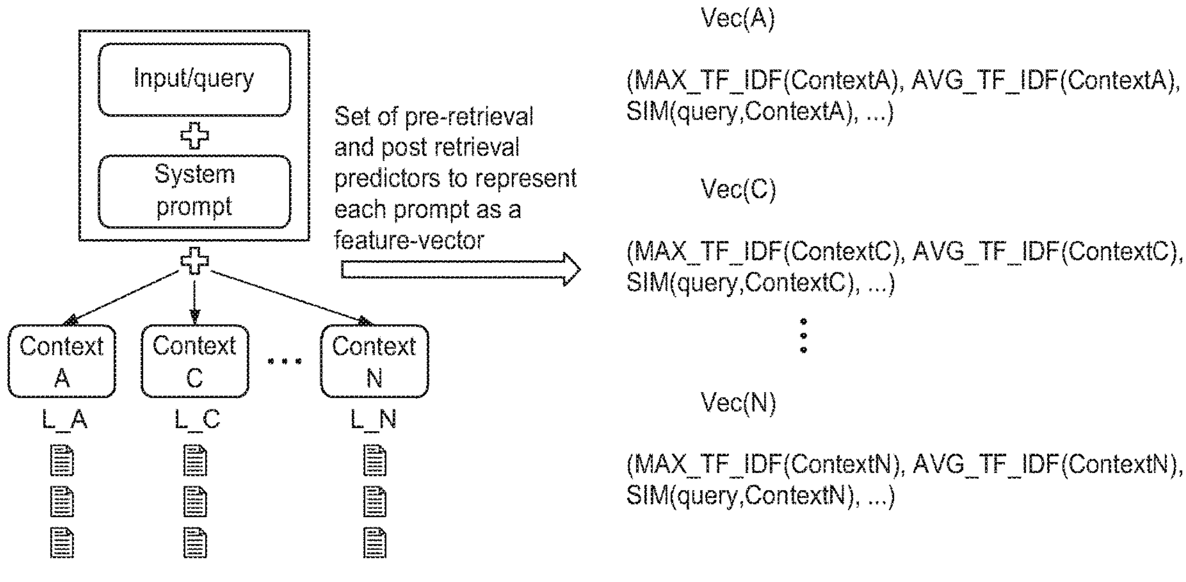
FIG. 6A and FIG. 6B show an example of selecting a selected context using the retriever in the architecture shown in FIG. 4, in accordance with one or more embodiments.
Figure 6B:
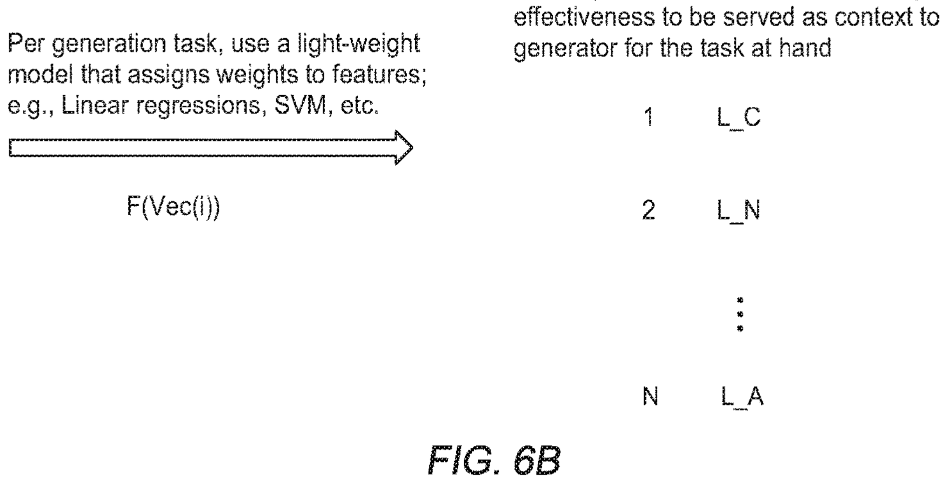

Attention is now turned to FIG. 6A and FIG. 6B, which should be considered as a whole. The retrievers have already generated the list of candidate contexts already, as described with respect to FIG. 4 and FIG. 5.

The results of FIG. 5 are shown as the selected context lists. The lists of contexts are "L_A," "L_C," through "L_N." Retriever B took too long to generate a list, and so the list for retriever B is not present.

The set of pre-retrieval and post retrieval predictors are represented as feature vector data structures (represented by Vec(A), Vec(B), etc.) Per generation task, a light-weight model (i.e., a model that is computationally efficient) may be used to assign weights to features. Examples of light-weight models include linear regression models, state vector machine (SVM) models, etc.

The context or retrieved results are ranked by effectiveness according to the effectiveness of each context when used with respect to the query. The outputs of the light-weight models may be combined in order to generate a final score for each context. The context with the highest final score, e.g., context "L_C" in FIG. 6B, is the final context to be used with respect to the query at hand.

Returning to FIG. 4, the selected context, "L_C" is provided to a generator (i.e., the large language model (LLM)) together with the input (i.e., the query), and a prompt. The output of the generator is the answer to the query (e.g., see FIG. 3 for the output of the large language model generator).

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figure 7A:
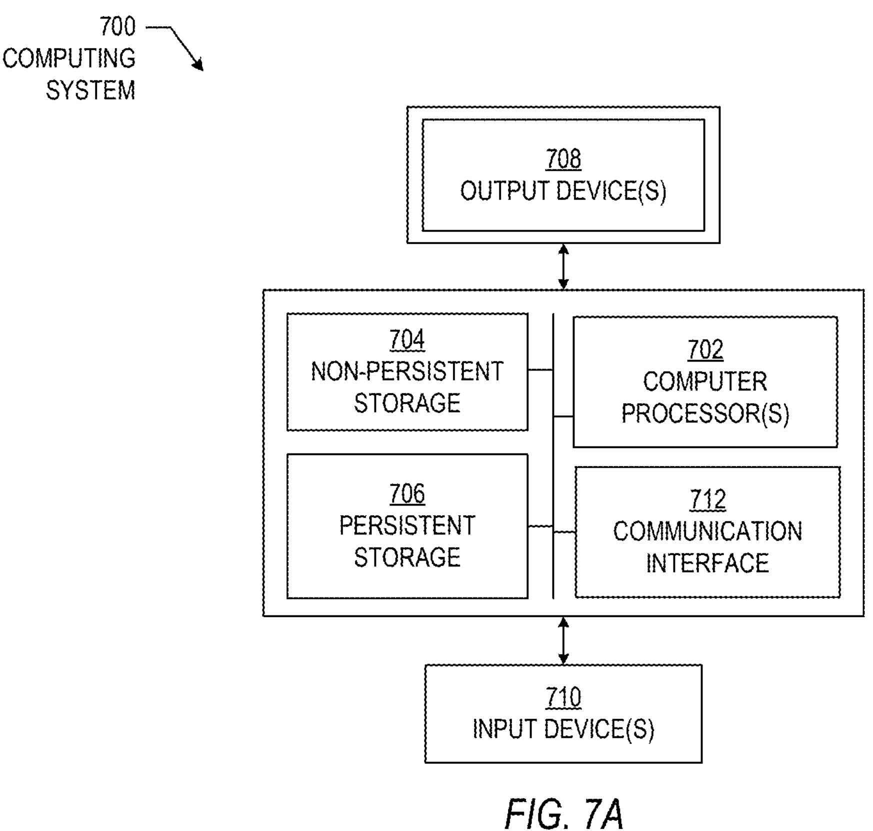
FIG. 7A and FIG. 7B show a computing system and network environment, in accordance with one or more embodiments.

For example, as shown in FIG. 7A, the computing system (700) may include one or more computer processor(s) (702), non-persistent storage device(s) (704), persistent storage device(s) (706), a communication interface (708) (e.g., Bluetooth interface, infrared interface, network interface, optical interface, etc.), and numerous other elements and functionalities that implement the features and elements of the disclosure. The computer processor(s) (702) may be an integrated circuit for processing instructions. The computer processor(s) (702) may be one or more cores, or micro-cores, of a processor. The computer processor(s) (702) includes one or more processors. The computer processor(s) (702) may include a central processing unit (CPU), a graphics processing unit (GPU), a tensor processing unit (TPU), combinations thereof, etc.

The input device(s) (710) may include a touchscreen, keyboard, mouse, microphone, touchpad, electronic pen, or any other type of input device. The input device(s) (710) may receive inputs from a user that are responsive to data and messages presented by the output device(s) (712). The inputs may include text input, audio input, video input, etc., which may be processed and transmitted by the computing system (700) in accordance with one or more embodiments. The communication interface (708) may include an integrated circuit for connecting the computing system (700) to a network (not shown) (e.g., a local area network (LAN), a wide area network (WAN), such as the Internet, mobile network, or any other type of network) or to another device, such as another computing device, and combinations thereof.

Further, the output device(s) (712) may include a display device, a printer, external storage, or any other output device. One or more of the output device(s) (712) may be the same or different from the input device(s) (710). The input device(s) (710) and output device(s) (712) may be locally or remotely connected to the computer processor(s) (702). Many different types of computing systems exist, and the aforementioned input device(s) (710) and output device(s) (712) may take other forms. The output device(s) (712) may display data and messages that are transmitted and received by the computing system (700). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium, such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (702), is configured to perform one or more embodiments, which may include transmitting, receiving, presenting, and displaying data and messages described in the other figures of the disclosure.

Figure 7B:
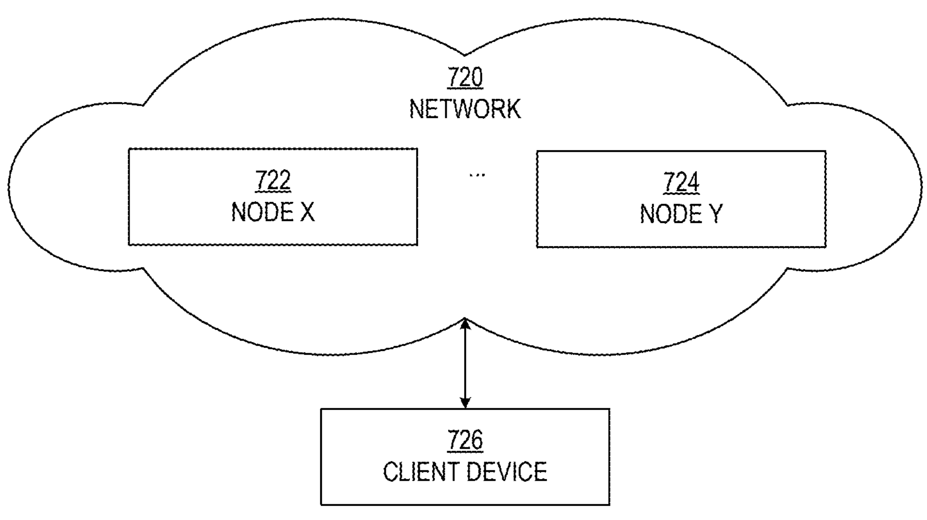

The computing system (700) in FIG. 7A may be connected to, or be a part of, a network. For example, as shown in FIG. 7B, the network (720) may include multiple nodes (e.g., node X (722) and node Y (724), as well as extant intervening nodes between node X (722) and node Y (724)). Each node may correspond to a computing system, such as the computing system shown in FIG. 7A, or a group of nodes combined may correspond to the computing system shown in FIG. 7A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (700) may be located at a remote location and connected to the other elements over a network.

The nodes (e.g., node X (722) and node Y (724)) in the network (720) may be configured to provide services for a client device (726). The services may include receiving requests and transmitting responses to the client device (726). For example, the nodes may be part of a cloud computing system. The client device (726) may be a computing system, such as the computing system shown in FIG. 7A. Further, the client device (726) may include or perform all or a portion of one or more embodiments.

The computing system of FIG. 7A may include functionality to present data (including raw data, processed data, and combinations thereof), such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before," "after," "single," and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method of increasing a computational efficiency of a computer executing a retrieval augmented generation (RAG) language model having electronic access to a plurality of potential contexts, the method comprising:

receiving a query to the RAG language model having electronic accesses to the plurality of potential contexts, wherein:
- the plurality of potential contexts further include a selected context, applicable to the query, selected from among the plurality of potential contexts, and
- the selected context is unknown when the query is received;

executing a plurality of ranking models on the query, wherein each of the plurality of ranking models outputs a corresponding candidate context from among the plurality of potential contexts,
- wherein each of the plurality of ranking models are different from each other, and
- wherein a plurality of candidate contexts are identified;

generating a plurality of vector data structures by transforming, for each output of the plurality of ranking models, a combination of the query and the corresponding candidate context into a corresponding vector data structure,
- wherein each of the plurality of vector data structures corresponds to a different output of the plurality of ranking models, and
- wherein transforming contextually relates each of the plurality of candidate contexts to the query;

executing a predictor model on the plurality of vector data structures to generate a plurality of probabilities, wherein each of the plurality of probabilities indicates a corresponding likelihood that the corresponding candidate context is the selected context;

selecting, according to the plurality of probabilities, the selected context from among the plurality of candidate contexts; and enhancing the RAG language model by applying only the selected context to the RAG language model to generate an enhanced RAG language model.

2. The method of claim 1, further comprising:

executing the enhanced RAG language model on a combination of the selected context, the query, and a prompt to generate a response to the query; and returning the response.

3. The method of claim 1, further comprising:

generating, prior to transforming the combination, a list of a plurality of candidate contexts from the corresponding candidate context output by the plurality of ranking models, wherein the plurality of vector data structures are arranged in the list.

4. The method of claim 3, further comprising:

enhancing the enhanced RAG language model by applying a second selected context in the list to the RAG language model.

5. The method of claim 1, further comprising:

excluding, while executing the plurality of ranking models on the query, an output of a rejected ranking model in the plurality of ranking models.

6. The method of claim 5, wherein the rejected ranking model is rejected in response to the rejected ranking model exceeding a threshold latency time to return a rejected candidate context.

7. The method of claim 1, further comprising:

selecting, prior to executing the plurality of ranking models on the query, the plurality of ranking models from a superset of ranking models.

8. The method of claim 7, further comprising:

determining, prior to executing the predictor model, a type of the query, wherein the plurality of ranking models is selected based on the type of the query.

9. The method of claim 7, further comprising:

determining, prior to executing the predictor model, a source of the query, wherein the plurality of ranking models is selected based on the source of the query.

10. The method of claim 1, further comprising:

selecting the predictor model from among a plurality of predictor models.

11. The method of claim 10, further comprising:

determining, prior to executing the predictor model, a type of the query, wherein the predictor model is selected based on the type of the query.

12. The method of claim 10, further comprising:

determining, prior to executing the predictor model, a source of the query, wherein the predictor model is selected based on the source of the query.

13. The method of claim 1, wherein the predictor model comprises a plurality of predictor models that generate a plurality of prediction scores corresponding to the plurality of potential contexts, and wherein the method further comprises:

combining the plurality of prediction scores to determine a set of final prediction scores for the plurality of potential contexts; and selecting the selected context according to a highest final prediction score from among the set of final prediction scores.

14. The method of claim 13, wherein the plurality of predictor models predict at least two of: an entropy of a term distribution in a prompt for the RAG language model, a readability score of the plurality of potential contexts, one or more sentences in the prompt, one or more terms in the prompt, and a semantic similarity of the plurality of potential contexts to the query.

15. A system for increasing a computational efficiency of a retrieval augmented generation (RAG) language model having electronic access to a plurality of potential contexts, the system comprising:

a computer processor and the RAG language model, executable by the computer processor, wherein the computer processor comprises a hardware computer processor;

a data repository in communication with the computer processor and storing:

a query, the plurality of potential contexts, a selected context applicable to the query, a corresponding candidate context, and a plurality of vector data structures, a plurality of ranking models which, when executed by the computer processor on the query, outputs, for each of the plurality of ranking models, the corresponding candidate context from among the plurality of potential contexts, wherein each of the plurality of ranking models are different from each other, and wherein a plurality of candidate contexts are identified;

a vector model which, when executed by the computer processor, transforms a combination of the query and the corresponding candidate context into a corresponding vector data structure for each output of the plurality of ranking models, wherein:

the plurality of vector data structures are generated by transforming, each of the plurality of vector data structures corresponds to a different output of the plurality of ranking models, and transforming contextually relates each of the plurality of candidate contexts to the query;

a predictor model which, when executed by the computer processor on the plurality of vector data structures, generates a plurality of probabilities, wherein each of the plurality of probabilities indicates a corresponding likelihood that the corresponding candidate context is the selected context; and a server controller which, when executed by the computer processor, enhances the RAG language model by:

selecting, according to the plurality of probabilities, the selected context from among the plurality of candidate contexts, and applying only the selected context to the RAG language model to generate an enhanced RAG language model.

16. The system of claim 15, further comprising:

the enhanced RAG language model.

17. The system of claim 15, further comprising:

a training controller which, when executed by the computer processor, trains the predictor model to identify a term frequency-inverse document frequency (TF-IDF) score based on a combination of the query and the plurality of potential contexts.

18. The system of claim 15, further comprising:

a ranking model selector which, when executed by the computer processor, selects, prior to executing the plurality of ranking models on the query, the plurality of ranking models from a superset of ranking models.

19. The system of claim 15, further comprising:

a predictor model selector which, when executed by the computer processor, selects the predictor model from among a plurality of predictor models.

* * * * *